United States Patent
Corwin et al.

(10) Patent No.: US 10,237,598 B2
(45) Date of Patent: *Mar. 19, 2019

(54) METHOD AND APPARATUS FOR INCREASING VIEWERSHIP OF BROADCAST PROGRAMMING

(71) Applicant: Fox Broadcasting Company, Los Angeles, CA (US)

(72) Inventors: Michael S. Corwin, Los Angeles, CA (US); William K. Bradford, Westlake Village, CA (US); Edward A. Skolarus, Manhattan Beach, CA (US)

(73) Assignee: FOX BROADCASTING COMPANY, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/689,835

(22) Filed: Aug. 29, 2017

(65) Prior Publication Data

US 2017/0359608 A1 Dec. 14, 2017

Related U.S. Application Data

(63) Continuation of application No. 14/912,062, filed as application No. PCT/US2014/050767 on Aug. 12, 2014, now Pat. No. 9,749,670.

(Continued)

(51) Int. Cl.
*H04N 21/443* (2011.01)
*H04N 21/254* (2011.01)
*H04N 21/475* (2011.01)
*H04N 21/81* (2011.01)
*H04H 20/38* (2008.01)

(Continued)

(52) U.S. Cl.
CPC ........ *H04N 21/2541* (2013.01); *H04H 20/38* (2013.01); *H04H 60/33* (2013.01);

(Continued)

(58) Field of Classification Search
CPC .......... H04N 21/2541; H04N 21/2668; H04N 21/4758; H04N 21/812; H04N 21/4438; H04H 20/38; H04H 60/33

See application file for complete search history.

(56) References Cited

U.S. PATENT DOCUMENTS 9,749,670 B2 * 8/2017 Corwin .............. H04N 21/2541
2003/0068046 A1 * 4/2003 Lindqvist .......... G06F 17/30867
380/277

(Continued)

OTHER PUBLICATIONS

International Search Report and Written Opinion dated Nov. 13, 2014 for PCT App. No. PCT/US2014/050767.

(Continued)

*Primary Examiner* — Hunter B Lonsberry
(74) *Attorney, Agent, or Firm* — Gates & Cooper LLP

(57) ABSTRACT

A system and method for generating or increasing viewership of a broadcast of an episode of a series by an affiliate to a plurality of receiver stations is disclosed. A live prefacing media program is transmitted to users within an affiliates market in such a way that does not conflict with the affiliate's exclusive right to transmit a media program within that market. The live prefacing media program includes media program clips from previous episodes of a series, and users can vote on their favorite media program clips. Such votes alter the content presented in the live prefacing media program. Transmission of the live prefacing media program terminates when the affiliates broadcast of the next episode of the series begins, thus encouraging or "throwing" viewers to view that episode.

35 Claims, 9 Drawing Sheets

Related U.S. Application Data

(60) Provisional application No. 61/865,022, filed on Aug. 12, 2013.

(51) Int. Cl.
*H04H 60/33* (2008.01)
*H04N 21/2668* (2011.01)

(52) U.S. Cl.
CPC ..... *H04N 21/2668* (2013.01); *H04N 21/4758* (2013.01); *H04N 21/812* (2013.01)

(56) References Cited

U.S. PATENT DOCUMENTS

| | | | |
|---|---|---|---|
| 2007/0156507 A1* | 7/2007 | Connelly | G06Q 30/0203 705/7.32 |
| 2009/0031336 A1* | 1/2009 | Chavez | H04N 21/466 725/24 |
| 2010/0057576 A1* | 3/2010 | Brodersen | G06Q 30/0273 705/14.69 |
| 2011/0058101 A1* | 3/2011 | Earley | H04L 12/1822 348/461 |
| 2012/0023590 A1* | 1/2012 | Rothschild | G06F 21/55 726/27 |
| 2012/0110607 A1* | 5/2012 | Rowland | H04N 21/25891 725/13 |
| 2013/0046825 A1* | 2/2013 | Anstandig | H04N 21/26258 709/204 |

OTHER PUBLICATIONS

International Preliminary Report on Patentability dated Jun. 17, 2015 for PCT App. No. PCT/US2014/050767.

* cited by examiner

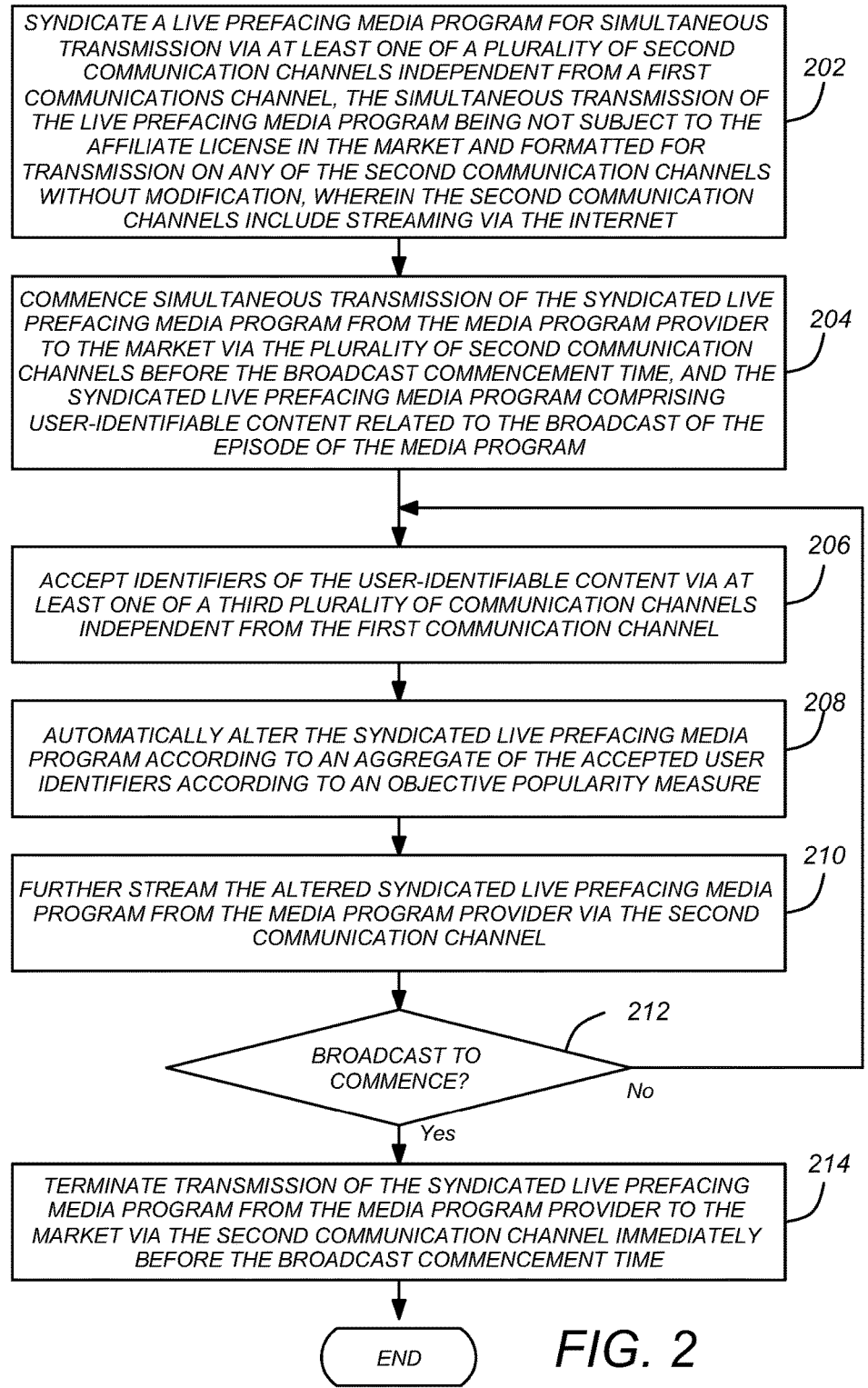

METHOD AND APPARATUS FOR INCREASING VIEWERSHIP OF BROADCAST PROGRAMMING

CROSS-REFERENCE TO RELATED APPLICATIONS

This application is a continuation of U.S. patent application Ser. No. 14/912,062, entitled "METHOD AND APPARATUS FOR INCREASING VIEWERSHIP OF BROADCAST PROGRAMMING," by Michael S. Corwin, et al., filed Feb. 12, 2016, issued Aug. 29, 2017 as U.S. Pat. No. 9,749,670, which application is a National Stage Application of and claims benefit under 35 U.S.C. 365 to PCT Patent Application No. PCT/US14/50767, entitled "METHOD AND APPARATUS FOR INCREASING VIEWERSHIP OF BROADCAST PROGRAMMING," by Michael S. Corwin, et al., filed Aug. 12, 2014, which claims benefit of U.S. Provisional Patent Application No. 61/865,022, entitled "METHOD AND APPARATUS FOR INCREASING VIEWERSHIP OF BROADCAST PROGRAMMING," by Michael S. Corwin, William K. Bradford, and Edward A. Skolarus, filed Aug. 12, 2013;

all of which applications are is hereby incorporated by reference herein.

BACKGROUND OF THE INVENTION

1. Field of the Invention

The present invention relates to systems and methods for broadcasting information and in particular to a method and apparatus for increasing viewership of broadcast programming.

2. Description of the Related Art

Media program providers such as FOX provides media programs to affiliates for broadcast into local markets for a fee and subject to a license which may define a particular market area or segment. The value of such programming (and hence, the licensing fee for providing the programming to the affiliate) is determined primarily by the popularity of the programming among viewers. It is therefore beneficial to the media program provider to increase the viewership of such programs.

It is also important that whatever means is used to increase the viewership not violate the affiliates' exclusive right to broadcast the media program in the market defined in the license, and not require the affiliate to devote their resources to such efforts. For example, it is known to broadcast lead-in shows before the broadcast of the primary show, with the purpose of the lead-in show to attract viewers that will continue to watch the same affiliate's broadcast when the lead-in show transitions to the primary show. The problem with this paradigm is that this requires the affiliate to broadcast the lead-in show. While the lead-in show may increase viewership of the primary show, it remains in question whether the increase in viewership offsets the viewership that might have been obtained by simply preceding the primary show with an independent show.

What is needed is a system and method for transmitting pre-show information that increases viewership of broadcast media programs that does not require the resources of licensed affiliates, does not violate the licenses to broadcast media programs in the market area granted to the licensed affiliates, yet is in a form that allows licensed affiliates to broadcast the pre-show information should they desire to do so. The below-described method and apparatus satisfies that need.

SUMMARY OF THE INVENTION

To address the requirements described above, the present invention discloses a method, apparatus, and system for generating viewership of a broadcast of an episode of a series by an affiliate to a plurality of receiver stations. In one embodiment, each receiver station is associated with at least one user, the broadcast commencing at a broadcast commencement time, the episode provided by a media program provider to the affiliate serving a market for the broadcast of the episode by the affiliate on a first communication channel, and the broadcast subject to an affiliate license exclusive to the market. In one embodiment, the method comprises (a) commencing simultaneous transmission of a syndicated live prefacing media program from the media program provider to the market via at least one of a plurality of second communication channels independent from the first communication channel before the broadcast commencement time, wherein (1) the syndicated live prefacing media program comprises user-identifiable content related to the broadcast of the episode; (2) the live prefacing media program is syndicated for simultaneous transmission via the at least one of the plurality of second communication channels; and (3) the simultaneous transmission of the live prefacing media program is not subject to the affiliate license in the market and is formatted for transmission on any of the plurality of second communication channels without modification. The method further comprises (b) accepting identifiers of the user-identifiable content via at least one of a third plurality of communication channels independent from the first communication channel; (c) automatically altering the syndicated live prefacing media program according to an aggregate of the accepted user identifiers according to an objective popularity measure; and (d) further transmitting the altered syndicated live prefacing media program from the media program provider via the second communication channel. Steps (b)-(d) may be repeated until the broadcast commencement time, at which time the transmission of the syndicated live prefacing media program from the media program provider to the market via the second communication channel can be terminated immediately before after the broadcast commencement time.

In another embodiment, the system comprises a plurality of receiver stations, each associated with at least one user, for receiving the broadcast; a server for commencing simultaneous transmission of a syndicated live prefacing media program from the media program provider to the market via at least one of a plurality of second communication channels independent from the first communication channel before the broadcast commencement time; and a viewer feedback module for accepting identifiers of the user-identifiable content via at least one of a third plurality of communication channels independent from the first communication channel and a generation module for automatically altering the syndicated live prefacing media program according to an aggregate of the accepted user identifiers according to an objective popularity measure, wherein the server further transmits the altered syndicated live prefacing media program from the media program provider via the second communication channel and terminates transmission of the syndicated live prefacing media program from the media program provider to the market via the second communication channel immediately before the broadcast commencement time.

BRIEF DESCRIPTION OF THE DRAWINGS

Referring now to the drawings in which like reference numbers represent corresponding parts throughout:

FIG. 2 is a diagram presenting exemplary operations that can be used to generate viewership of an episode of a media program;

DETAILED DESCRIPTION OF PREFERRED EMBODIMENTS

Figure 1:
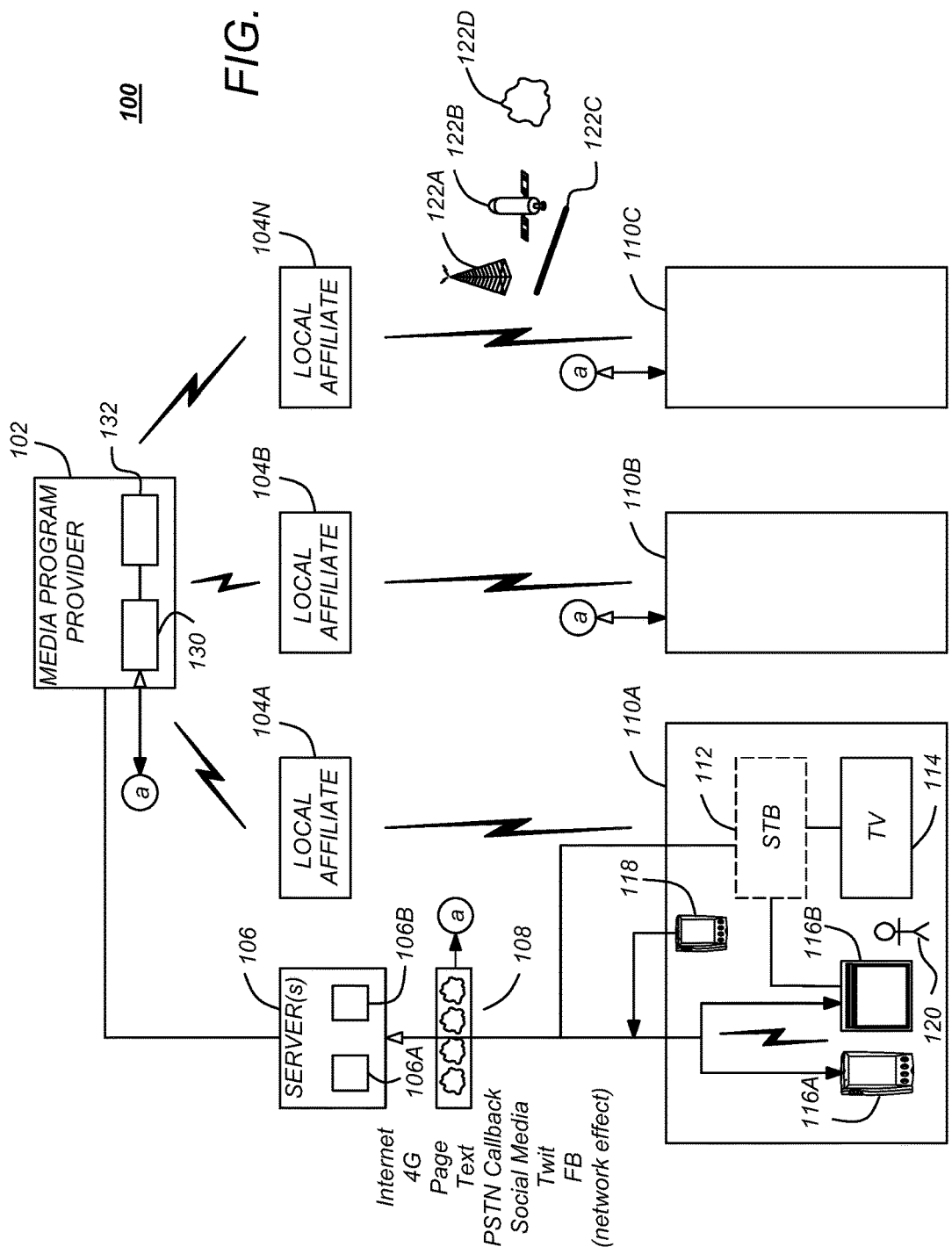
FIG. 1 is a diagram of an integrated viewer network.

In the following description, reference is made to the accompanying drawings which form a part hereof, and which is shown, by way of illustration, several embodiments of the present invention. It is understood that other embodiments may be utilized and structural changes may be made without departing from the scope of the present invention.

In the following discussion, the following conventions are used:

Media program: A television show, typically comprising video and audio information. The media program may stand by itself or depict an event or group of events that occur as a part of a sequence of events. For example, a media program may consist of a movie, or an episode of a series of episodes (as described further below).

Series: A plurality of media programs that depict a group of related events that together present a story or contest. In one embodiment, the series includes a serialized story, with each installment of the story presented in temporal order according to the story depicted in the series. In another embodiment, the series depicts a group of related events that are not serialized in temporal order. One example of such a series is "THE SIMPSONS," where each event or episode is related in the sense that the characters are chosen from the same cast of characters, but not serialized in temporal order.

Episode: One of the series of media programs that together comprise a series. For example, a media program depicting an installment of the FOX television series "SO YOU THINK YOU CAN DANCE" is referred to as an episode. In some cases, the group of serially related events include only those broadcast or to be broadcast during a broadcast season. For example, a series may be defined to include a single season of episodes of "SO YOU THINK YOU CAN DANCE," that is, a series depicting a closed set of contestants until a winner is determined. Or, a series may be defined to include all of the episodes of the series across all seasons.

Syndicate: Syndication refers to the sale of the right to transmit media programs created or managed by a media program provider. Typically, such transmission is performed by independent affiliates that are often associated with a particular geographical area.

Live: As used herein, a "live" transmission of content constitutes content that is transmitted substantially as it is created. For example, the LPMP described below is created from user votes at or near real time, and is transmitted no intentional delay, save for a slight delay to allow the content to be reviewed for potential censorship if necessary.

Overview

The pre-show experience is a user driven, social TV experience hereinafter referred to as a live prefacing media program (LPMP) that engages an active community in real time. One embodiment of the LPMP uses clips from previously broadcast episodes of a current season series provided by media providers such as FOX.

Viewer fans can interact with the content provided by the LPMP by commenting on the series or episode and by voting for favorite clips of episodes presented in the LPMP via a social network such as TWITTER or other communication means. In one embodiment, the LPMP presents a video screen having a number of concurrently presented and updated components.

A first component comprises a listing or other representation of a plurality of media program clips of earlier broadcast episodes, each representation including an identifier or other means allowing the user to select or vote for that media program clip.

A second component comprises a media program player that presents clips of earlier broadcast episodes of the series. As further described below, the clip presented by the media program player may be the media program clip having the greatest number of votes cast by viewers using the first component, or may cycle through the top N vote-receiving media program clips.

A third component comprises a listing or other representation of media program clips to be played in by the media program player after the currently playing clip is completed. Alternatively, the third component may comprise a listing or other representation of the top vote-receiving media program clips, but only the top vote-receiving media program clip is played by the media program player of the second component.

Viewers can vote on their favorite media program clip via the LPMP itself, or by use of a communication path independent from that which is used to transmit the LPMP, for example by use of social media services such as TWITTER. As described above, the most popular media program clip of the series (determined from such votes) may be concurrently played back in the media program player of the LPMPs second component.

In one embodiment, when a media program clip currently played back by the media program player ends, the media program clip that currently has the highest percentage of votes automatically launches. That show clip may be the previously presented media program clip (if the previously presented media clip remains the most popular) or another media program clip, as the identity of the most popular of the media program clips could change with every viewer vote. In one embodiment, the vote tallies may be periodically reset. This renews viewer interest in voting, and in embodiments where only the top vote-receiving media program clip is played in the media program player, allows other media program clips to be played.

Media program clips may include other content in addition to simply temporal segments of a previously broadcast episodes of the series. Such additional content may be original and/or unique to the LPMP, and can include any information that can entice more viewers of the series to view the LPMP and thereby increasing the on-air viewership of the episode transmitted immediately after presentation of the LPMP has completed. Such original content may include "behind the scenes" footage, deleted or unincluded scenes, "interviews with stars/writers/production staff", teasers/trailers, background information on contestants or the contests they are engaged in. The additional content may also be customized to the viewer, for example, according to viewer demographic information received by the media program provider. Such viewer demographic information may reflect the demographics of each individual user (e.g. as expressed in viewer preferences) or aggregated demographics (e.g. expressed according to other factors such as the viewer's location, age, or viewing habits, as recorded by the receiver station 110A or transmitted to the media program provider 102.

Typically, the LPMP includes information related to only one series. Accordingly, content related to SO YOU THINK YOU CAN DANCE and THE SIMPSONS will not be presented on the same LPMP. Also, the LPMP for each series may be presented on a different communications channel (e.g. webpage/URL or broadcast channel) than the other series. Hence, in this embodiment the LPMP for SO YOU THINK YOU CAN DANCE is presented on a different broadcast channel or URL than THE SIMPSONS.

In other embodiments, the LPMP may present content for more than one series, either concurrently or serially. For example, the LPMP for all series originating from the media program provider may be provided at the same URL or broadcast channel.

The LPMP is typically created in real-time on an interactive platform, and is streamed or otherwise transmitted to the a webpage via media server or service. The LPMP can be provided via the series' webpage on the media program provider's website (e.g. Fox.com/dance/preshow) via an Internet streaming service/player. As an example, the LPMP may be embedded into a provider's website (e.g., www.fox.com) or on webpages on other web properties (e.g., owned/affiliated with the owner of www.fox.com). Further, such content may be simulcast and syndicated across a number of platforms and/or communication links such as websites, mobile apps, cable channels, satellite channels, and/or terrestrial television.

The content includes representations of the media program clips from earlier broadcasts of previous episodes of the series (or alternative original content as described above), and viewers can vote on their favorites from among the representations of the media program clips. Votes may be provided via a different device and/or communication link or channel than the one presenting the pre-show content. For example, a user could vote for or otherwise select a media program clip by TWEETING or texting an appropriate alphanumeric presented in the LPMP that is associated with the media program clip. Alternatively, to accommodate users that do not have access to a device independent from the device presenting the LPMP, a live social TWITTER feed having an input for providing tweets, texts, FACEBOOK posts with hash marks (#) or other input may be provided on the show's webpage, thus allowing users to watch the clips and TWEET at the same time using the same device.

In one embodiment, the LPMP "pre-show" is of half-hour duration and "throws" the viewing audience to tune into the live, on-air broadcast of the associated show for which the LPMP is being conducted. In this embodiment, the LPMP pre-show is a live pre-show that can be simulcast without any editing and can be syndicated across vast numbers of digital platforms for the purpose of aggregating an audience to the same experience, and "throwing" that audience to the subsequent on-air broadcast. In this context, an "on-air" broadcast transmission is not necessarily a wireless transmission. Instead, an "on-air" broadcast transmission refers to the simultaneous transmission of a media program to a plurality of recipients, whether by wireless (e.g. terrestrial transmission or satellite transmission) or wired (e.g. copper or optical cable) or hybrid transmission (e.g. use of both wired and wireless transmission between the broadcaster and the receiver station.

The LPMP pre-show launches/premiers the show in the digital domain, in a way that complies with affiliate licenses (which grant the affiliate the exclusive right to transmit the episode itself in the affiliate's market), without requiring affiliate resources, while providing affiliates with the option of broadcasting the LPMP show itself if desired, thus aggregating the audience of the LPMP pre-show into another experience in real time.

Hence, the LPMP pre-show achieves the objective of garnering additional ratings and advertising revenue for both the media program provider and the affiliate. Improved ratings for current programming is generated by creating an enticing and engaging marketing experience that involves active fan participation "creating the moment" and collectively "re-living" the experience of the show's "world" by encouraging fans to join together in a "social media living room" to collaborate or compete with each other to determine what portion of the show's "world" the audience will "re-live" together in real time.

A traditional social network voting experience is thus utilized to attract/aggregate the audience in the digital domain around media program clips of previously broadcast episodes. This builds increased levels of enthusiasm among fans for the series and particularly, the soon to be broadcast episode. Active fan-to-fan communication, collaboration and/or competition regarding media program clips are replayed/relived communally by the fans, attract the attention of those fans, thus providing a springboard to "throwing" those fans to the live television broadcast of the episode (i.e. using the digital experience to entice viewers to view the on-air broadcast that immediately follows the LPMP social networking pre-show). In one embodiment, during the course of the LPMP pre-show, banners may be presented that animate on and off the screen and :15 and :30 promo spots may "air" or be presented between the media program clips to alert the LPMP audience about other programming from the media program provider. These banners and the spots could also be sold to sponsors.

The LPMP may "throw" viewers to the on-air broadcast of the episode in a number of ways. First, the LPMP may "throw" viewers to the on-air broadcast by inducing such viewers to manually control equipment at their receiving station to receive the on-air broadcast after the LPMP has completed transmission or when the on-air broadcast of the episode begins. Second, the LPMP may provide a control within or appurtenant to the LPMP itself that allows the viewer to enter a command to control the receiving station equipment to receive the on-air broadcast. Such a control may be an interactive hot-spot (e.g. a region of the LPMP) that may be selected (e.g., "clicked on") by the user to "change channels" to an affiliate (e.g., a Fox affiliate) in an interactive television environment. Third, the LPMP may be configured to issue a command to the receiver station equipment to automatically change channels to an affiliate shortly before the commencement of the life television broadcast of the episode without user intervention.

FIG. 1 is a diagram of an integrated viewer network 100. A media program provider 102 creates or obtains media programming such as television shows, which may have a plurality of episodes or editions. Such media programs are provided to local or national affiliates 104A-104N (hereinafter, "affiliates") who, for a licensing fee provided to the media program provider 102, rebroadcast the media programs via medium 122 (which may include terrestrial wireless 122A, satellite wireless 122B, or cable 122C, or Internet 122D transmission) to receiving facilities or stations 110A-110C (hereinafter alternatively referred to as receiver station(s) 110) with their market. Media program provider 102 may also transmit information, including the LPMP to the receiver stations 110 via medium 122.

The receiver stations 110 may comprise a monitor or television 114 for viewing the media programs provided by the media program provider and transmitted by the associated affiliate 104. In ordinary broadcast embodiments, the display device 114 includes electronics and processing required to receive the signal transmitted by the local affiliate 104. In other embodiments, a set top box (STB) 112 or similar device receives the signals and provides them to the display device 114 such as monitor or television for viewing.

Typically, the license that is provided to the local affiliates 104 to transmit the media program to subscribers or viewers 120 preclude the media program provider 102 from providing any portion of the media programs by a means independent from the local affiliates to their market in a way that would compete with that of the local affiliate 104. Each affiliate's "market" may be defined by a geographical area in which the signal from the affiliate may be received. For example, in the case of a terrestrial transmitter, the "market" may be the area in which the terrestrial transmitter's signal may be received at the receiver stations 110. In the case of a satellite transmitter, the satellite 122A may use spot beams to limit transmission of the signal to particular geographical regions. "Markets" may also be determined by the status of the consumer, for example, the market may be defined to include a person 120 that is provided access to the transmitted program, regardless of their location (e.g. persons who have subscribed to a particular media service).

For example, media program providers 102 typically do not stream media programs via the Internet at the same time that a local affiliate 104 may be broadcasting the same media program, because such a transmission would compete with the transmission from the local affiliate 104. Transmission of the same media program after a "premiering" transmission by the local affiliate 104 is less problematic, as such re-broadcast does not compete with the "premiering" transmissions by the local affiliate 104. In this context, "premiering" refers to the first broadcast of the media program in the market or area, whether or not the broadcast is truly live (e.g. broadcast in real time as the subject matter of the media program occurs).

The integrated viewer network 100 also comprises a server element 106 that can comprise one more servers such as media server 106A and web server 106B. Media server 106A can be used by the media program provider 102 to transmit LPMP pre-shows (hereinafter alternatively referred to as LPMPs) to receiver stations 110 via the internet. Web server 106B communicates commands and other information between the media program provider 102 and the receiver stations 110, including user identified LPMP content, as described further below.

The LPMPs may be transmitted and reproduced using the STB 112 and/or the TV 114, or may be presented on secondary devices 116 such as a smartphone 116A or a home computer 116B such as a desktop, laptop, or tablet computer. Communications between the servers 106 and the receiver station 110 may be provided via any suitable transmission medium including the Internet, Wi-Fi, a 3G or 4G cellphone network, text network, cable, satellite or similar transmission medium. Return communications from the receiver stations 110 may be provided via the secondary devices 116, alternate device 118, or the STB 112 using either the same communication medium used to transmit the LPMP, or a different medium. For example, the media servers 106A may transmit the LPMP to the receiving station 110 via the Internet, yet receive user input (e.g. votes or selections) via a 4G or paging network using a smartphone as the secondary device 116 via web server 106B or medium 122. The streaming media server 106 may also transmit the LPMP to the STB 112 of the receiver station 110, for presentation by the display device 114.

The LPMP may be transmitted via one or more servers under the control of the local affiliates 104A or by servers under control of the media program provider 102. For example, the LPMP may be available at a URL of a website controlled by the local affiliate 104 or the URL of a website controlled by the media program provider 102.

FIG. 2 is a diagram presenting exemplary operations that can be used to practice one embodiment of a method for generating viewership of a media program (which may comprise an episode of a series) transmitted by an affiliate 104. The media program is provided by the media program provider 102 to the affiliate 104 under a license exclusive to the market served by the affiliate 104, and the affiliate 104 broadcasts media program on a first communication channel at a broadcast time. As the transmission from the affiliate 104 to the receiver station 110 may be via satellite, terrestrial broadcast, cable, or means of the Internet, the first communication channel can be defined according to frequency division multiplexing, time division multiplexing, code division multiplexing, transmission or multicasting via a unique URL, or any combination thereof.

In one embodiment, the media program provider 102 comprises a broadcast network such as FOX, but the media program provider 102 may comprise any source of a media program, particularly one that has the rights to distribute the media program to other entities such as affiliates 104 for broadcast. In one embodiment, the media program is one of a plurality of episodes of a series of media programs that are transmitted over a broadcast season. For example, the FOX series "So You Think You Can Dance," may be broadcast every Tuesday and Wednesday evening, and a broadcast season may comprise 15 episodes of an hour length. Affiliates 104 include entities that compensate the media program provider 102 for a license to broadcast the media program to their market. Typically, such licenses are exclusive within the local affiliate's market. This exclusivity also typically precludes the transmission of any media program episode or portion thereof that would compete with the affiliate's broadcast of the media program or portion, possibly even via different communication channels. For example, the license granted to the affiliate 104 would typically preclude the transmission of the media program into the market via the Internet by any entity other than the affiliate 104 associated with that market area in a way that would compete with the affiliate's transmission (e.g. transmitted to the same or substantially overlapping market before or at the same time as the affiliate's transmission).

In block 202, a live prefacing media program (LPMP) is syndicated for simultaneous transmission via at least one of a plurality of second communication channels that are independent from the first communication channel. In this context, "syndication" refer to the media program provider 102 making the LPMP available through a variety of media outlets for simultaneous live transmission under the media program provider's ultimate control. The making of the LPMP available through media outlets on second communication channels could include, for example, live streaming via the media program provider's website via the Internet, 3G or 4G system, providing source HTML and web links for incorporation on other websites (e.g. fan websites, the affiliate's website, or any other website that permits the live streaming of the media program). Importantly, the transmission of the LPMP is not subject to the affiliate's exclusive license to transmit the media program within its market.

In one embodiment, the LPMP is formatted such that it can be simultaneously transmitted via any of a plurality of second communication channels without modification. For example, in one embodiment, the LPMP is a television video signal without an interactive television overlay. A basic signal such as this can be simply live streamed over the Internet, broadcast using existing digital broadcast systems, transmitted via cable, transmitted via a 3G or 4G network . . . all without modification of the content.

In block 204, the transmission of the LPMP from the media program provider 102 of the provider is commenced. This transmission may also be performed by one or more agents of the media program provider 102. Importantly, the transmission of the LPMP occurs before the commencement time of the broadcast of the media program or episode that will be later transmitted by the affiliates 104 to their local market areas, and the transmission of the LPMP is completed immediately before the transmission of the media program episode begins. The timing is important, because the purpose of the LPMP is to garner an audience for the media program episode and entice that audience to switch devices or communication channels to view the media program or episode after transmission of the LPMP is completed.

To facilitate audience involvement, the LPMP typically includes identifiers or other information that permit the viewer to select content presented in the LPMP and to transmit that selection to the media program provider 102. For example, the LPMP may include visual representations for one or more media program clips of previously broadcast episodes of the series, and selecting one of the visual representations may transmit information to the media program provider 102 indicating selection of associated media program clip. Such selection may indicate, for example, that the viewer is voting for that media program clip. Other means for identifying the content presented in the LPMP include text, user selectable still images or moving images in visual proximity to the content.

In block 206, the media program provider 102 or its agent(s) accept identifiers of the user-identified content from users viewing the LPMP. This can be accomplished, for example, via viewer feedback module 130, which can be part of the media program provider 102 (as illustrated) or a separate entity acting as an agent for the media program provider. In one embodiment, the identifiers are transmitted via a different communication channel than are used to transmit the media program or the LPMP. For example, the media program may be transmitted by digital broadcast, the LPMP by the Internet or 4G, and the identifiers received by text messages. Alternatively, the identifiers may be received on the same communications channel transmitting the LPMP, for example, as shown further below, using a text input widow on an internet browser.

In one embodiment, the identifiers are accepted via social networking system such as FACEBOOK or TWITTER, thus allowing the user's friends or followers to see the activities of the user. This is particularly useful when the identifiers reflect votes for the content associated with the identifier, as further discussed below.

In block 208, the media program provider 102 or agent automatically alters the LPMP according to the received user identifiers. This can be accomplished, for example, by the LPMP generation module 132 illustrated in FIG. 1. In one embodiment, the LPMP is altered according to the received user identifiers to change which media program clip is played back in the LPMP, as further described below.

The LPMP may be altered according to an objective measure such as popularity, as determined only by a count or percentage votes as determined by identifiers received from users. This modification can occur automatically (without direct human intervention in response to the received identifier).

Alternatively, the LPMP may be altered according to the received user identifiers as well as subjective information, such as that which may be provided by a host or producer of the media program or series. For example, the host of the series or episode can make a decision whether to modify the LPMP based upon the received identifiers or not, and can make this decision based on other information. Viewer votes may be recorded anonymously and/or aggregated so as to be untraceable to the viewer that cast the vote.

In block 210, the altered LPMP is transmitted from the media program provider 102 or agent(s) via the second communication channels. Block 212 determines if the broadcast of the episode of the media program is about to commence. If the episode of the media program is not about to commence, processing is passed to block 206 where further identifiers may be received and used to further alter the LPMP for further transmission as described in blocks 206-210. If the episode of the media program is about to commence, processing is passed to block 214, where the transmission of the LPMP is terminated. Preferably, the transmission of the episode of the media program begins immediately after such termination, thus feeding viewers from the LPMP to the episode of the media program.

First Exemplary Embodiment of LPMP

Figure 3A:
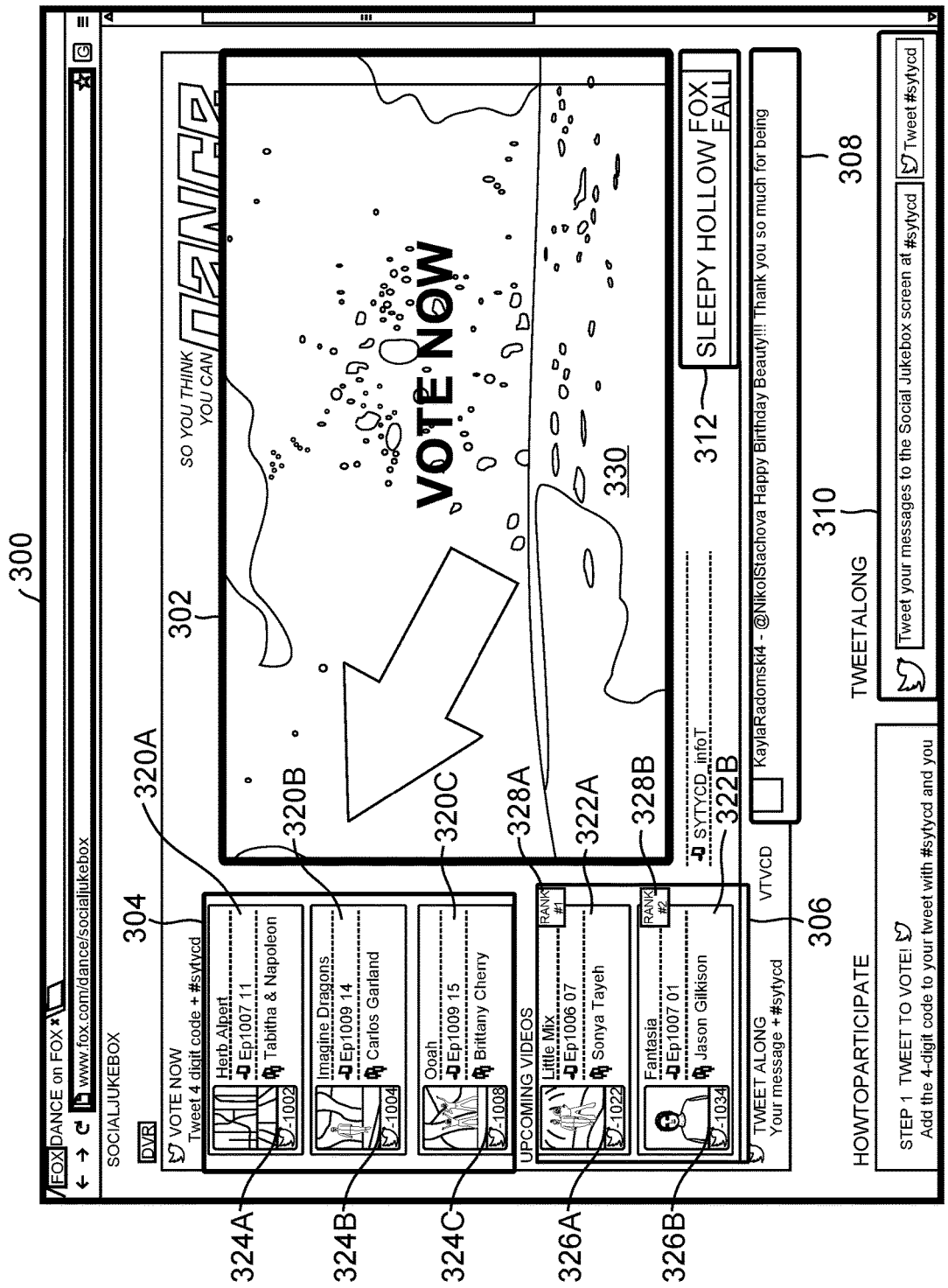
FIGS. 3A-3D are diagrams of embodiments of the live prefacing media program.

FIG. 3A is a diagram illustrating first exemplary embodiment of the LPMP 300. The illustrated LPMP 300 comprises a number of concurrently presented portions including a first portion 302 presenting a media player 330, a second portion 304 and a third portion 306.

The media player 330 is used to playback at least a portion of a previously broadcast episode of the series of media programs associated with the LPMP 300. For example, if the media program is "SO YOU THINK YOU CAN DANCE" and episodes 1-9 of that program has been previously broadcast by affiliates 104, but episode 10 has not yet been broadcast, the media player 330 of the first portion 302 can be used to playback a media program clip depicting a performance by one of the contestants of the media program that occurred in one of broadcast episodes 1-9.

In one embodiment, unlike a typical media program player that plays streaming video transmitted by the Internet, however, no individual recipient of transmitted LPMP 300 can control playback of the media program in the first portion 302. Accordingly, no end-user controls for modifying or controlling the playback of the media program are offered. However, as further described below, in the aggregate, users determine which of the media program clips of previously broadcast episodes are presented in the first portion 302, via votes that are transmitted to the media program provider 102 via secondary devices 116, an alternative device 118, or other means.

In the illustrated embodiment, the second portion 304 presents a plurality of subportions 320A-320C, each of the plurality of subportions 320A-320C representing one of a plurality of portions (e.g. clips) of previously broadcast media program episodes (e.g. portions of episodes 1-9 in the current example). Each one of the subportions includes an identifier or indicia 324A-324C which make the media program clip associated with the subportion 324A-324C user-identifiable, so that the user may identify the media program clip in communications transmitted back to the media program provider 102. The subportions 320 may list an episode identifier indicating the episode the clip was obtained from (e.g. Ep1007 11), the actors or participants in the clip (e.g. Tabitha & Napoleon) and a title (e.g. Imagine Dragons)

In the illustrated embodiment, the indicia 324A-324C comprises a number unique to the portion of the previously broadcast media program episode. In this embodiment, the user can transmit the number associated with a media program clip to the media program provider 102 to vote for that media program clip. This may be accomplished by texting the number to a particular telephone number, or TWEETING the number (along with a hashtag associated with the series, such as #sytycd for the series "SO YOU THINK YOU CAN DANCE," or by manipulating a device in the receiver station 110 to selecting the identifier 324A-324C or the subportion 320A-320C associated with the desired media program clip. This can be accomplished, for example, by suitable input to the STB 112 providing the LPMP 300 to the display device 114. In one embodiment, the numbers 324A-324C associated with the representations of the media program clips are not randomly or serially assigned, but rather, given values which allow them to be easily remembered or distinguished.

While second portion 304 of the embodiment shown in FIG. 3A includes three subportions 320A-320C, providing a representation of an associated media program clip, a greater or lesser number of subportions 320A-320C may be used. Further, a greater number of representations of associated media clips can be presented within second portion 304 configuring the LPMP 300 to scroll through associated media clips the subportions. In embodiments wherein the LPMP 300 is a simple feed, this can be accomplished by generating the feed with the LPMP 300 with each of the representations 320. For example, after illustrating representations 320A-320C, representation 320A may move upwards and disappear from the second portion 304, with representation 320B taking it's place. Similarly, representation 320C takes the place of representation 320B, and representation not shown in FIG. 3A can roll up into the position formerly occupied by representation 320C.

Scrolling may also be accomplished by configuring the LPMP 300 with a user-manipulatable scroll bar. This embodiment may be implemented when the LPMP 300 is presented on a device accepting user commands such as the STB 112 or secondary devices 116.

In the illustrated embodiment, the LPMP 300 also comprises a third portion 306 presents a plurality of representations 322A-322B of one or more media program clips of previously broadcast media program episodes. Such representations 322 may include the same information as representations 320, but may also include a rank identifier indicating which clip has amassed the most votes.

In one embodiment, the media program clips are a listing of media program clips that are scheduled to be replayed in the media program player 330, in the order that they are to be played. For example, in the illustrated embodiment, the media program clip associated with representation 322A is the next media program clip to be played, and following playback of that media program clip, the next media program clip to be played by the media program player 330 is the media program clip associated with representation 322B.

In one embodiment, the media program clips that are scheduled to be replayed are selected according to user voting via the indicia presented in portion 304. Such media program clips can be automatically determined (e.g. without human intervention) and based upon an aggregate of user votes based upon an objective popularity measure. For example, in the illustrated embodiment, the third portion 306 presents video clips that will be played back by the media player 330 after the video clip currently played by the media player 330 has completed playback. These video clips can be represented by graphic representation 322A and 322B presented in portion 306, and are determined based upon votes cast by other viewers.

The illustrated embodiment also discloses a fourth portion 310 that can be optionally included within the first portion 302. This fourth portion 310 may be used to provide the identifiers of the content presented in the LPMP 300 to the media program provider 102 or its agents, or to simply enter textural input to TWEET a message. The tweeted message typically comprises a comment regarding the content currently being played by the media program player 330, but may comprise a comment about any of the content of the LPMP 300. The comment may be received by the media program provider 102 or its agent(s) and incorporated into the LPMP 300 in another portion such as portion 308 for all viewers to see, thus giving fans an opportunity for individual recognition. Or, the tweeted message can comprise one of the identifiers 324A-324C and 326A-326B associated with content 320A-320C and 322A-322B. By tweeting the appropriate identifier, the viewer of the LPMP 300 may vote regarding the viewer's favorite clip of earlier episodes (1-9) of the media program, as replayed by media player 330.

In other embodiments, the viewer may vote from among the media program clips associated with representations 320A-320C by manipulating a cursor or other indicator to designate the desired media program clip representation and selecting the desired media program clip representation.

If desired, the received votes may be analyzed to prevent multiple votes in the same session, or permit multiple votes over a particular interval. For example, the viewer may be permitted to vote more than once, but no more often than every five minutes or other time interval. This encourages the viewer to continue to view the LPMP 300 so that they can continue to vote. Or, viewers may be allowed to vote an unlimited number of times for the same clip.

The first portion 302 may also be used to play advertisements in between playback of the most popular clip of the previous media program episode, and such advertisements may be directed to other media programs available from the media program provider 102, or to further "throw" viewers to the soon to be broadcast episode of the series associated with the LPMP 300. Fifth portion 312 can also be used for such purposes.

In one embodiment, the LPMP 300 is compressed according to a video compression standard such as MPEG (Motion Pictures Experts Group) or a QuickTime file format (QTFF) (e.g. "*.mov")

In one embodiment, the entire LPMP 300 may be transmitted as a whole in a single stream. For example, the LPMP 300 may be transmitted according to the MPEG standard with the LPMP 300 is identified by a single program identifier (PID). In this embodiment, the temporal and spatial compression of the images presented in the LPMP is performed on the LPMP 300 as a whole, and the selection of each portion 302, 304 and 306 can be accomplished via an overlay.

In another embodiment, each of the portions 302, 304 and 306 of the LPMP are streamed in a one or more transport streams with each portion 302, 304 and 306 identified by a different identifier, with the assembly of each portion 302, 304 and 306 performed at the receiver station 110 using the packets for each elementary stream associated with the PID. In this case, the receiver station 110 may assemble the LPMP 300 from each MPEG transport stream.

Figure 3B:
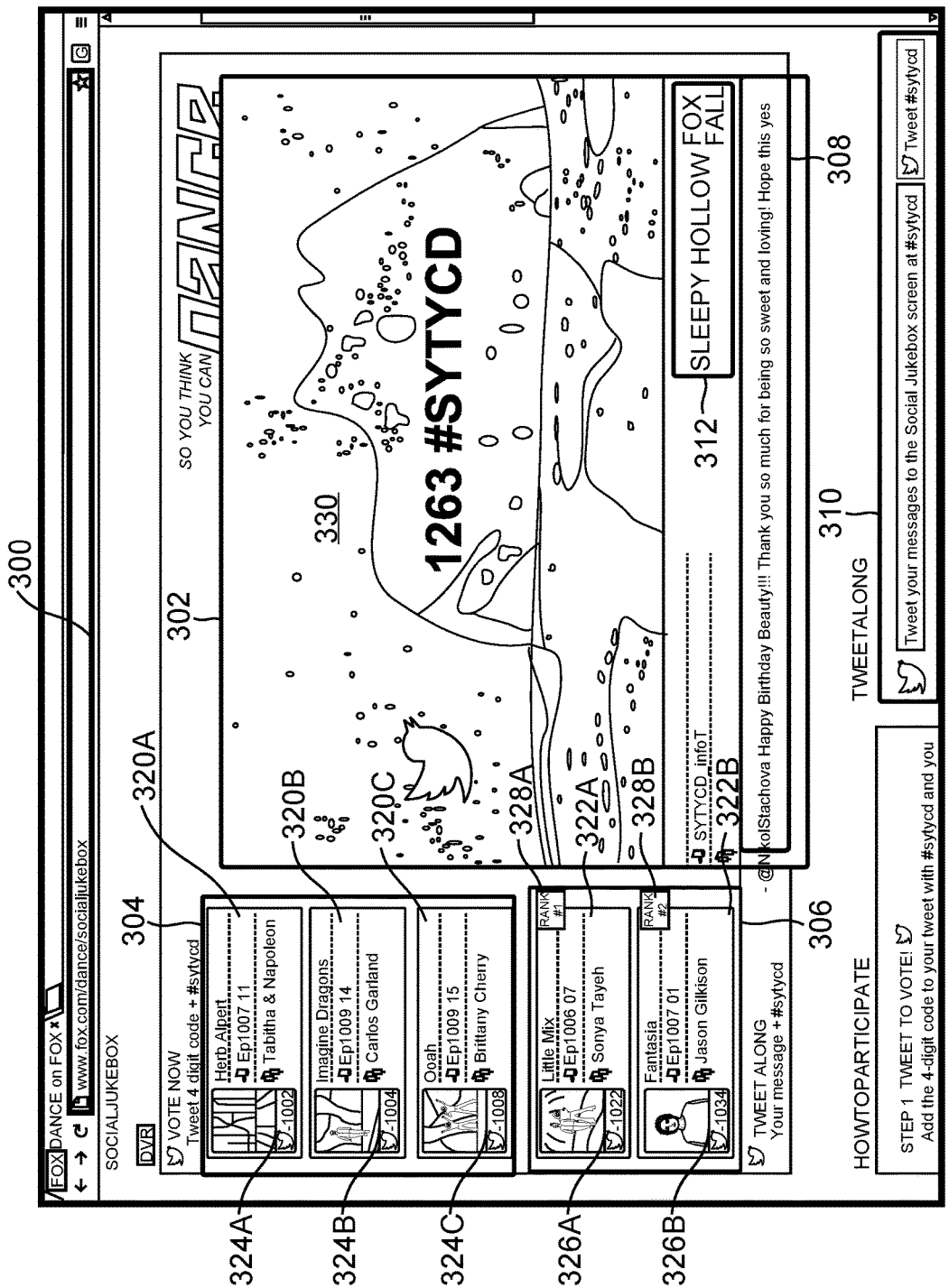

FIG. 3B is a diagram illustrating how the media player 330 can be used to indicate the identifier for the content and the use of a hash tag (#SYTYCD) that refers to the media program for voting.

Figure 3C:
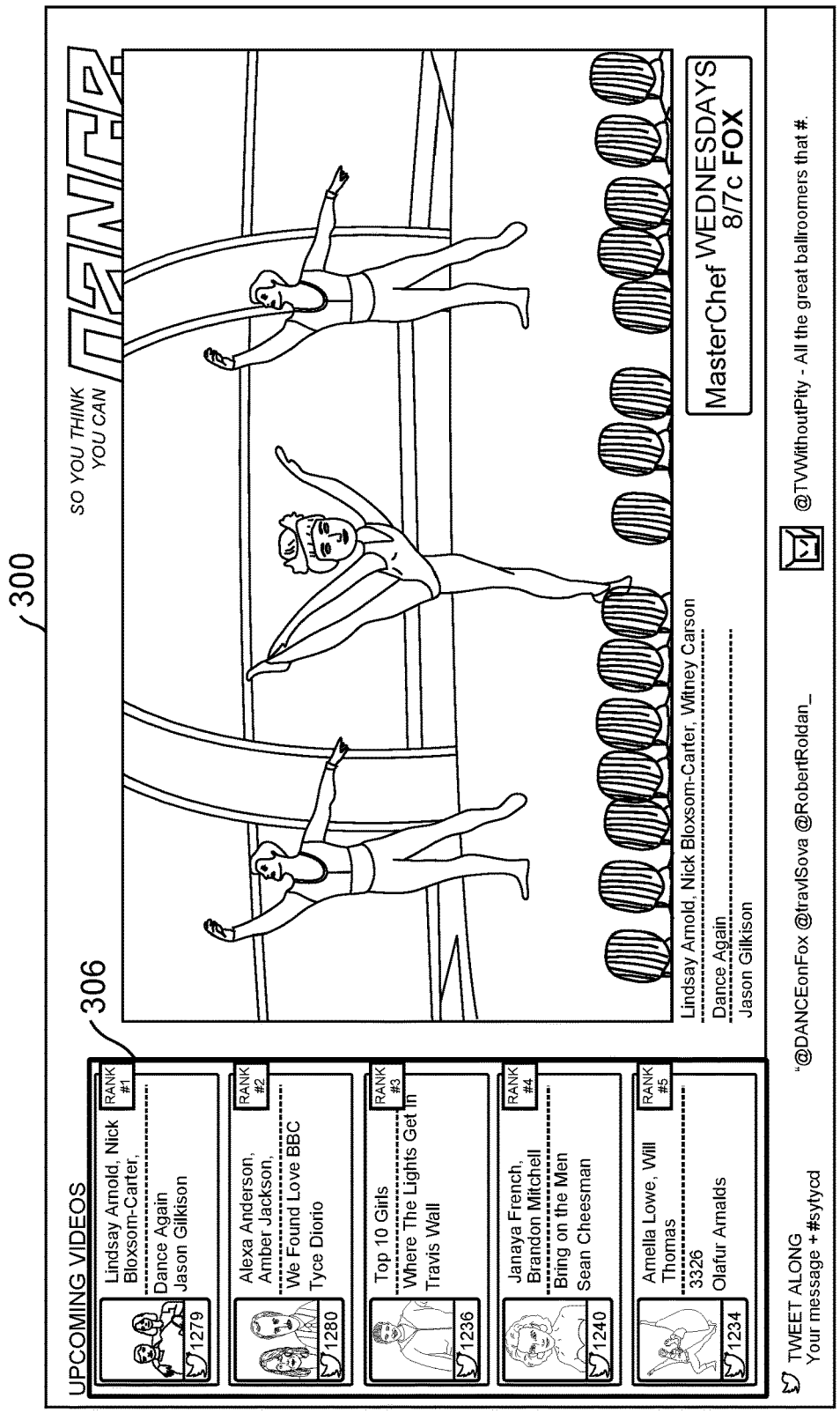

FIG. 3C is a diagram illustrating how top vote-receiving content may be highlighted in by expanding the third portion 306. This can incentivize viewers to vote even more for the performance they love. This version of the LPMP may be shown occasionally (e.g. every 10 minutes or other suitable interval) without user command or in interactive embodiments, may be presented in response to a suitable user command (e.g. by selecting within first portion 306 of FIG. 3A or 3B. Second portion 304 may also be similarly expanded.

Portions 302 and 304 may be updated in real-time, and graphics 322 representing video clips can swap positions in the order ranking as votes are counted and included in the results.

In one embodiment, the next media program clip to be played by the media player 300 is the video clip that is currently the most popular media program clip (e.g. the media program clip with the greatest number of votes, for example, the media program clip represented by graphic representation 322A). Hence, the media player 300 may automatically commence playing the media program clip that is currently the most popular media program clip when the currently played media program clip completes playback or if a promotion for another media program or other advertisement is scheduled, after that promotion or advertisement has completed. Alternatively, to prevent the same media program clip from replaying multiple times without replacement, the if the media program clip currently played by the media player 330 is the media program clip receiving the largest number of votes, the next media program clip to be played by the media player 330 can be selected to be the media program clip receiving the second largest number of votes, or media program clip randomly selected from the top N video clips.

Viewers can collaborate with each other via social media such as TWITTER or FACEBOOK to encourage votes for the favorites, while other fans can band together to elevate their favorites to a higher ranking.

The fifth portion 312 or another portion of the LPMP 300 could comprise a countdown clock graphic to build the enthusiasm and heighten anticipation, thus inducing viewers to tune into the imminent broadcast of the media program episode. As described above, fifth portion 512 can also be used for ads for entities other than the media program provider.

Figure 3D:
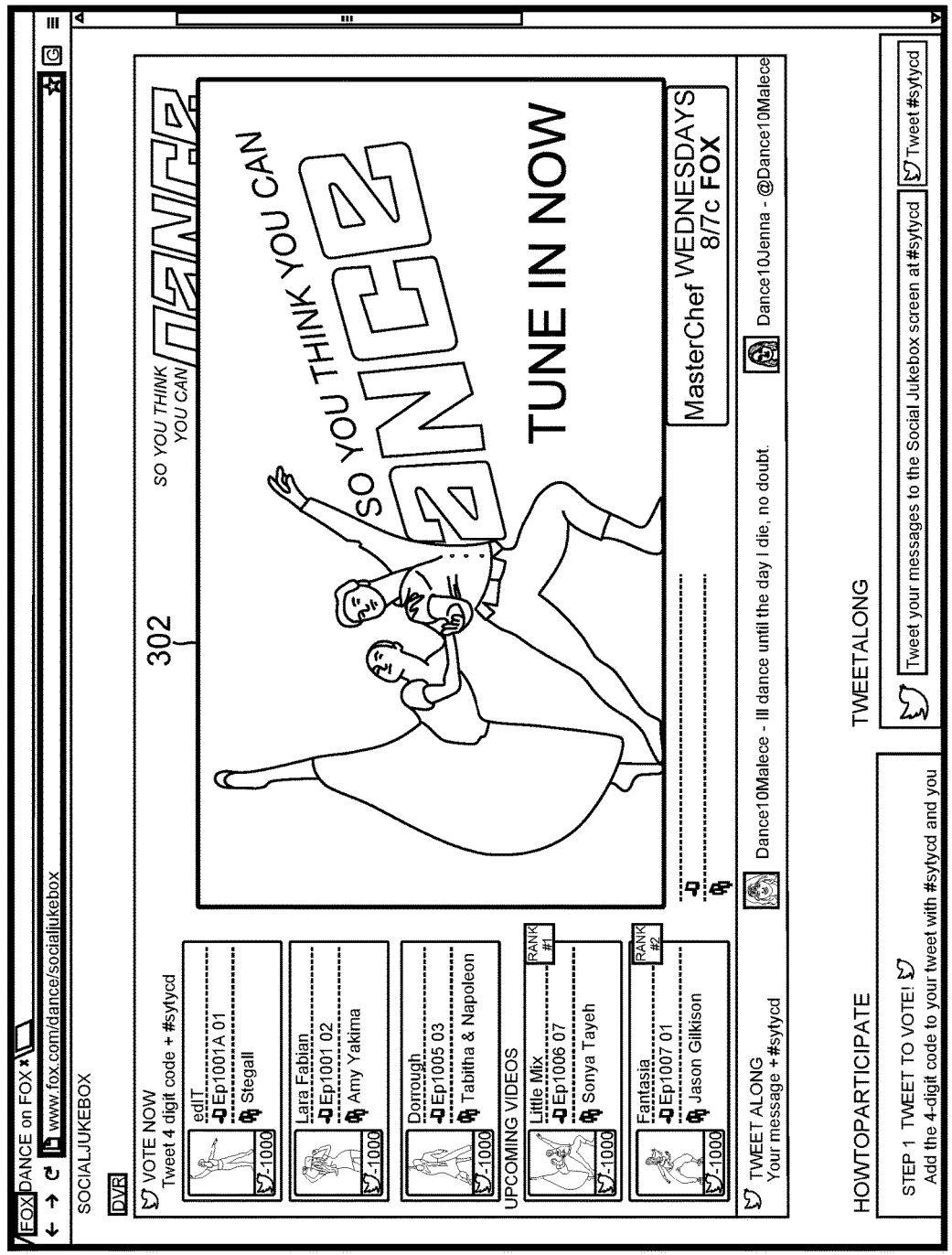

FIG. 3D is a diagram of an exemplary embodiment of the LPMP 300 as presented temporally just before transmission of the LPMP 300 is completed and the broadcast of the media program or episode is to begin (e.g. at a time indicated by decision block 212 of FIG. 2).

In the illustrated embodiment an interstitial video or still frame is presented in the first portion 302 to induce LPMP viewers to view the live broadcast of the media program by the affiliates.

In one embodiment, user selection of the first portion 302 automatically commands the appropriate device in the receiver station 110 to receive the live broadcast of the newest episode of the series. This may be accomplished by providing a suitable command to the S1B 112, display device 114, or one of the secondary devices 116. For example, if the LPMP 300 is provided by the STB 112 to the display device 114 for display, the user may command the STB 112 to tune to the live broadcast of the newest episode of the series by manipulating STB controls (either on the S1B or via a remote control) to highlight and select the first portion 302. Selection of the first portion 302 commands the STB 112 to tune to the appropriate broadcast channel. In another possible embodiment wherein the LPMP 300 is presented on a computer 116B, the selection of the first portion 302 may transmit a command to the STB to tune to the appropriate broadcast channel, with the S1B 112 providing the received broadcast channel information to the display device 114 or the computer 116B. Selection of the first portion 302 may also command the computer 116B to access the website of the appropriate affiliate 104 to receive the live broadcast of the episode via the web.

Second Exemplary Embodiment of LPMP

Figure 4:
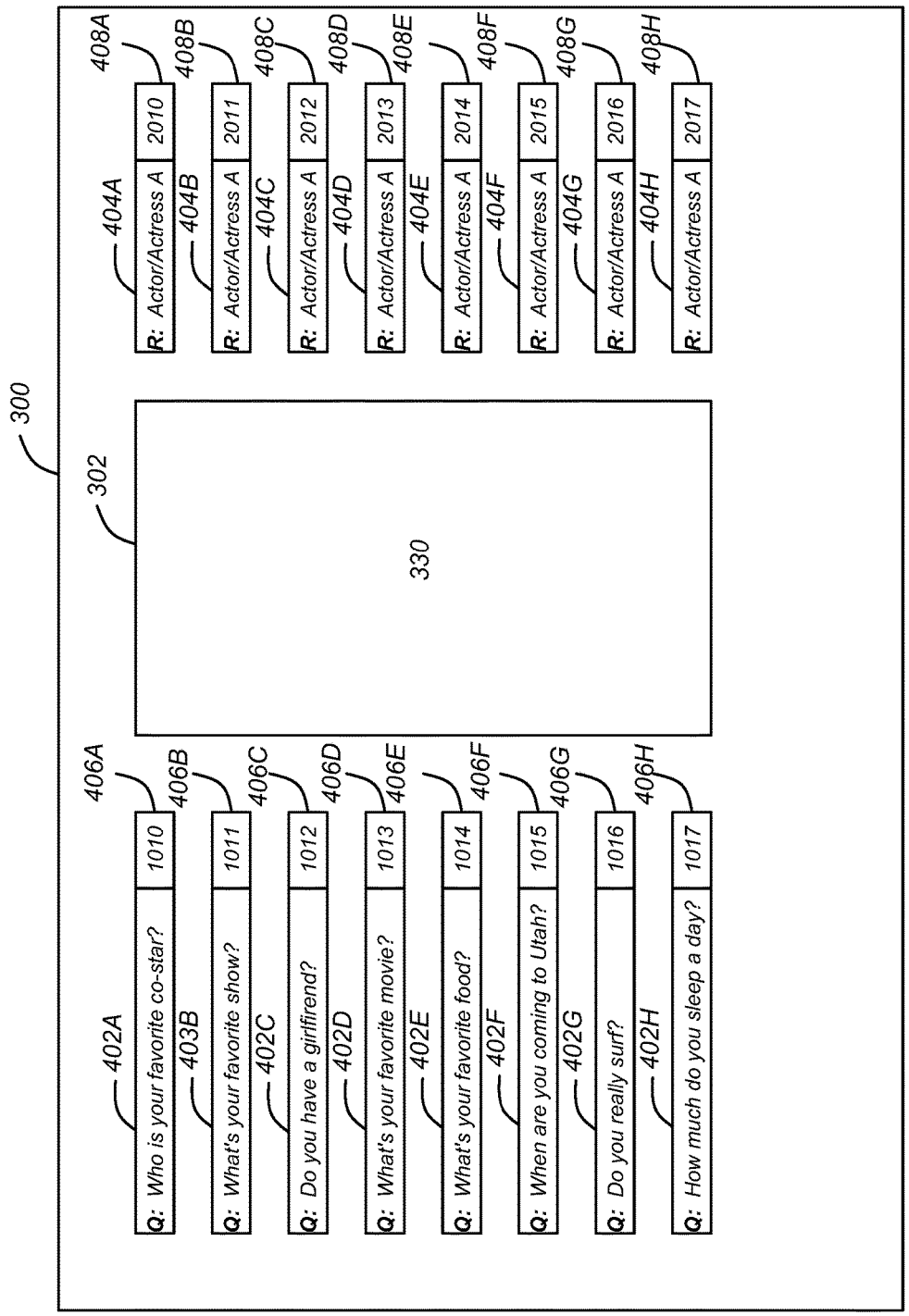
FIG. 4 is a diagram illustrating an exemplary embodiment of a live prefacing media program.

FIG. 4 is a diagram illustrating a second exemplary embodiment of the LPMP 300. In this embodiment, which may be referred to as a "social roulette" embodiment, the LPMP 300 includes a number of portions 402A-402H that presents questions that have been submitted by viewers to pose the actors or participants of the media program episode. Viewers may submit these questions by any means, including texting or tweeting them to the appropriate telephone number or tweet address. Further, viewers may vote on their favorite questions by use of identifiers 406A-406H, each associated with one of the portions 402A-402H. The identifiers 402A-402H may be selected via a cursor and selection command as described above, or the identifiers 402A-402H may include a number or alphanumeric that the user can tweet or text to vote for their favorite question. Each portion 402A-402H may be organized to present the most popular question (the one receiving the most votes) first (e.g. in position 402A) and the remaining questions in descending order.

The LPMP 300 may also have a number of further portions 404A-404H which list the participants (including actors, actresses or producers) associated with the media program episode to be broadcast or episodes which have been broadcast. Such participants can also be voted on to determine the favorite participant which may be presented in portion 404A, with the remaining participants placed in order of the number or percentage of received votes.

Portion 302 may include media program player 330 showing a live program in which the participants themselves are depicted, or may present only textural responses from the participants, who may all be in remote locations.

As votes are received for questions and participants, the order of both the questions and the participants will change over time. In one embodiment, the questions are matched with the participants in order of popularity, with the most popular participant being asked the most popular question, with video of the question being asked presented by the media player 330. In other embodiments, viewers can vote for a particular question to be directed to a particular participant regardless of the overall popularity of either, by entering the identifiers 406 associated with the questions 402 in a way that associates such question with the identifier or an associated participant. For example, the number 10102011 may be entered to indicate that the person votes for directing question 402A to participant 404B.

Time Zone Issues

As the communication channel for the LPMP 300 may be different than the communication channel(s) used by the affiliates 104, this can present problems associated with time zones. For example, one affiliate (104B) may be in the Eastern time zone, while another (104A) may be in the Pacific time zone, which is three hours later. In the case where the LPMP is transmitted via the Internet, the LPMP 300 may be viewable by people in the Pacific time zone before it is appropriate, or after the appropriate time by people in the Eastern time zone. In the first case, the "throw" effect of the LPMP 300 to entice viewers to switch to view the media program would be substantially compromised if the transmission of the LPMP 300 is completed substantially before transmission of the media program episode begins, as viewers may become disinterested in the interim. In the second case, there is the possibility that the "throw" will be ineffective, as viewers may continue to watch the LPMP 300 instead of the episode of the media program as desired.

To account for this situation, the second communication channels used to transmit the LPMP 300 can be monitored and controlled to assure that the LPMP 300 is transmitted only at appropriate times. In cases where the LPMP 300 is transmitted via the Internet, geoblocking techniques can be used to allow the reception of the LPMP 300 in particular market areas only at appropriate times. This can be accomplished by identifying the recipients IP address and mapping that address to the recipient's location, and geoblocking transmissions to those IP addresses at all times except so that the LPMP 300 transmission is completed immediately before the affiliate's broadcast of the media program episode in the same market area. If necessary, persons seeking access to the LPMP 300 before the appropriate time may be diverted to another webpage or URL that displays other useful information.

Hardware Environment

Figure 5:
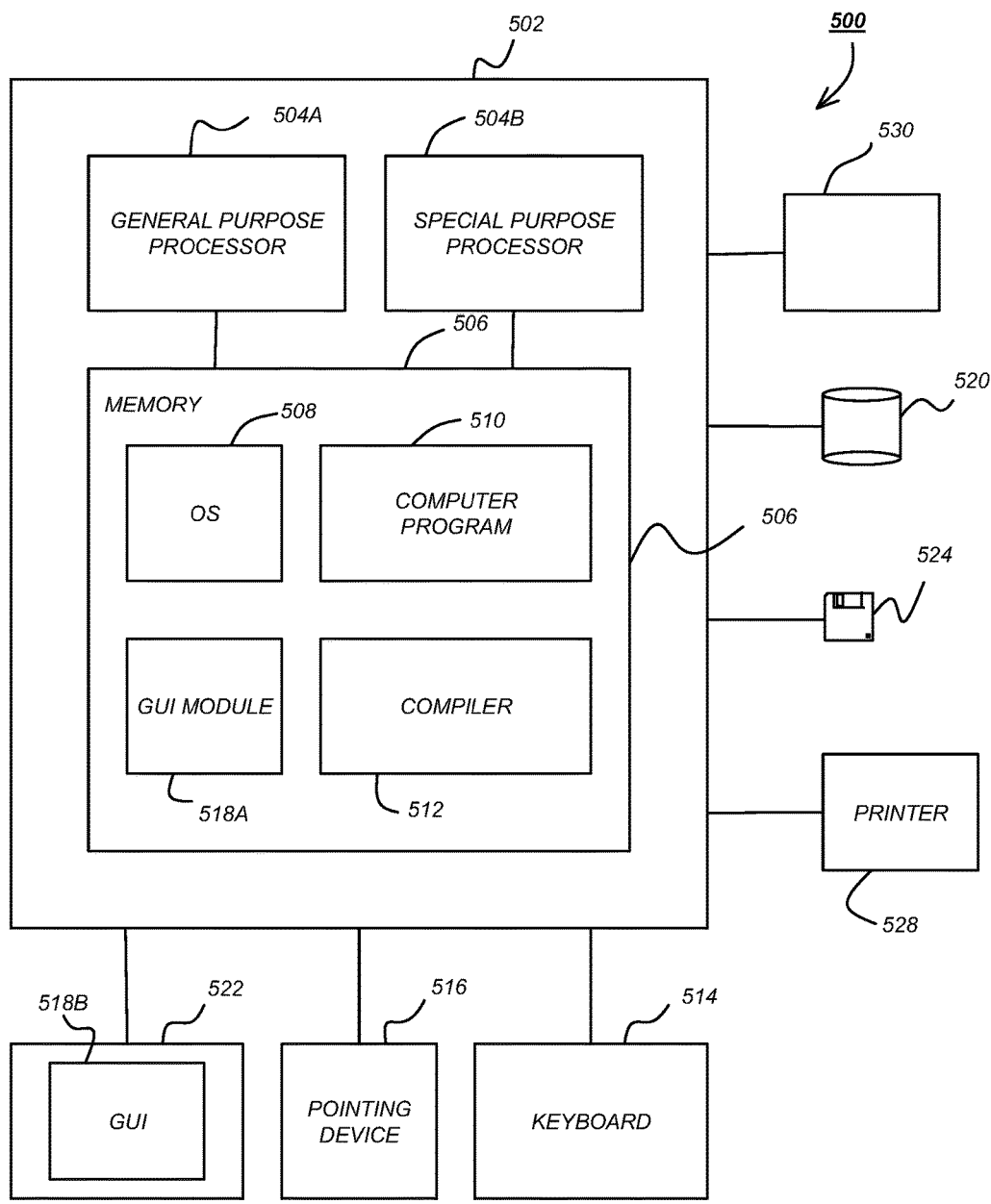
FIG. 5 is a diagram illustrating exemplary hardware that could be used to implement elements of the present invention.

FIG. 5 is a diagram illustrating exemplary hardware 500 that could be used to implement elements of the present invention. The computer 502 comprises a general purpose hardware processor 504A and/or a special purpose hardware processor 504B (hereinafter alternatively collectively referred to as processor 504) and a memory 506, such as random access memory (RAM). The computer 502 may be coupled to other devices, including input/output (I/O) devices such as a keyboard 514, a mouse device 516 and a printer 528.

In one embodiment, the computer 502 operates by the general purpose processor 504A performing instructions defined by the computer program 510 under control of an operating system 508. The computer program 510 and/or the operating system 508 may be stored in the memory 506 and may interface with the user and/or other devices to accept input and commands and, based on such input and commands and the instructions defined by the computer program 510 and operating system 508 to provide output and results.

Output/results may be presented on the display 522 or provided to another device for presentation or further processing or action. In one embodiment, the display 522 comprises a liquid crystal display (LCD) having a plurality of separately addressable pixels formed by liquid crystals. Each pixel of the display 522 changes to an opaque or translucent state to form a part of the image on the display in response to the data or information generated by the processor 504 from the application of the instructions of the computer program 510 and/or operating system 508 to the input and commands. Other display 522 types also include picture elements that change state in order to create the image presented on the display 522. The image may be provided through a graphical user interface (GUI) module 518A. Although the GUI module 518A is depicted as a separate module, the instructions performing the GUI functions can be resident or distributed in the operating system 508, the computer program 510, or implemented with special purpose memory and processors.

Some or all of the operations performed by the computer 502 according to the computer program 510 instructions may be implemented in a special purpose processor 504B. In this embodiment, some or all of the computer program 510 instructions may be implemented via firmware instructions stored in a read only memory (ROM), a programmable read only memory (PROM) or flash memory within the special purpose processor 504B or in memory 506. The special purpose processor 504B may also be hardwired through circuit design to perform some or all of the operations to implement the present invention. Further, the special purpose processor 504B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 502 may also implement a compiler 512 which allows an application program 510 written in a programming language such as COBOL, C++, FORTRAN, or other language to be translated into processor 504 readable code. After completion, the application or computer program 510 accesses and manipulates data accepted from I/O devices and stored in the memory 506 of the computer 502 using the relationships and logic that was generated using the compiler 512.

The computer 502 also optionally comprises an external communication device such as a modem, satellite link, Ethernet card, or other device for accepting input from and providing output to other computers.

In one embodiment, instructions implementing the operating system 508, the computer program 510, and/or the compiler 512 are tangibly embodied in a computer-readable medium, e.g., data storage device 520, which could include one or more fixed or removable data storage devices, such as a zip drive, floppy disc drive 524, hard drive, CD-ROM drive, tape drive, or a flash drive. Further, the operating system 508 and the computer program 510 are comprised of computer program instructions which, when accessed, read and executed by the computer 502, causes the computer 502 to perform the steps necessary to implement and/or use the present invention or to load the program of instructions into a memory, thus creating a special purpose data structure causing the computer to operate as a specially programmed computer executing the method steps described herein. Computer program 510 and/or operating instructions may also be tangibly embodied in memory 506 and/or data communications devices 530, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 502.

Although the term "computer" is referred to herein, it is understood that the computer may include portable devices such as cellphones, portable MP3 players, video game consoles, notebook computers, pocket computers, or any other device with suitable processing, communication, and input/output capability.

Figure 6:
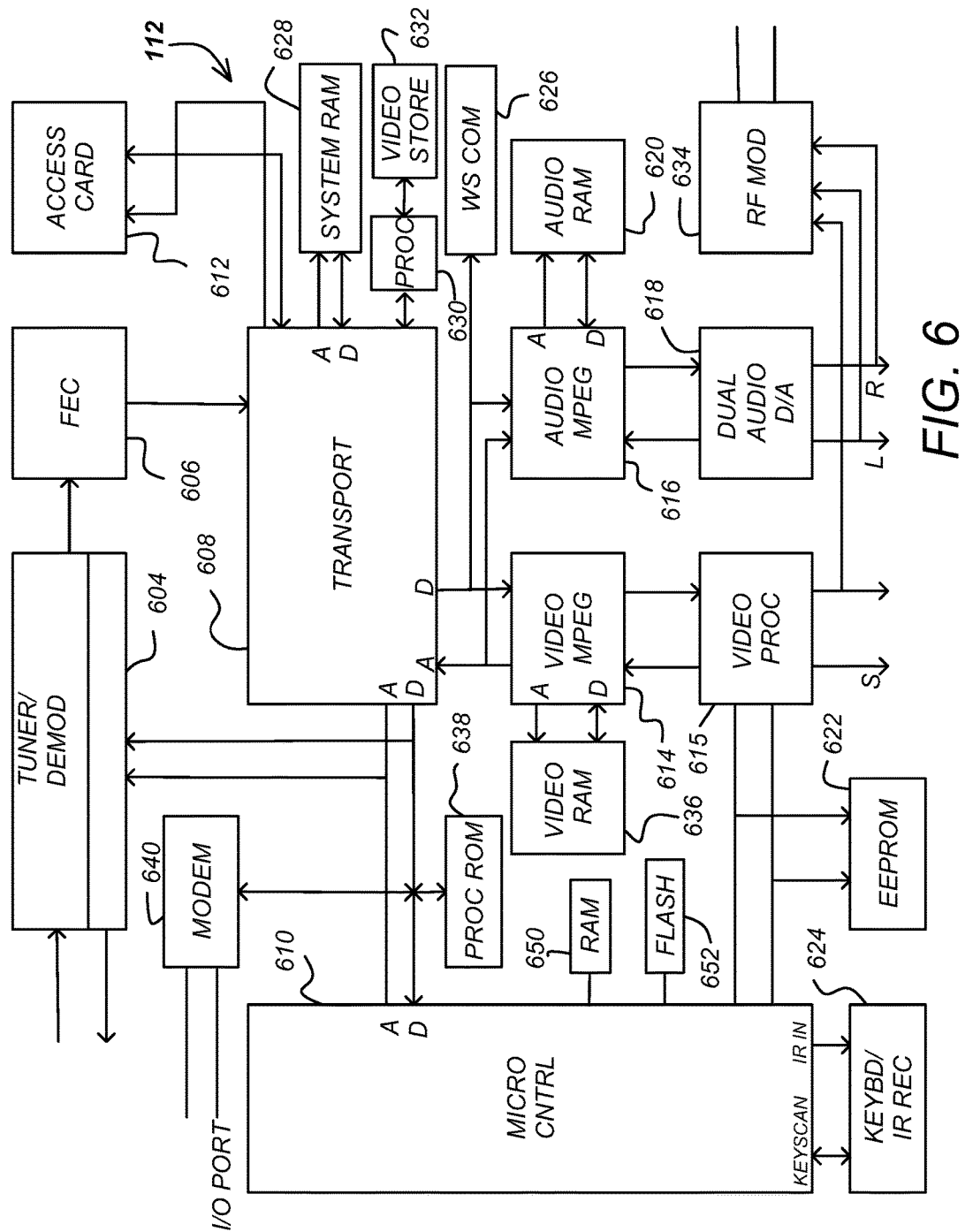
FIG. 6 is a diagram illustrating an exemplary set top box.

FIG. 6 is a block diagram of an exemplary embodiment of an STB 112 (also hereinafter alternatively referred to as receiver or integrated receiver/decoder, or IRD). The STB 112 comprises a tuner/demodulator 604 that converts the modulated data to a digital data stream. In embodiments wherein the received signal comprises data packets, the tuner/demodulator 604 identifies the type of each packet as they are received. The digital data stream is then supplied to a forward error correction (FEC) decoder 606. This allows the STB 112 to reassemble the data transmitted by the media program provider 102 (which applied the forward error correction to the desired signal before transmission to the subscriber receiving station 110) verifying that the correct data signal was received and correcting errors, if any. The error-corrected data may be fed from the FEC decoder module 606 to the transport module 608 via an 8-bit parallel interface.

The transport module 608 performs many of the data processing functions performed by the STB 112. The transport module 608 processes data received from the FEC decoder module 606 and provides the processed data to the video (e.g. MPEG) decoder 614, the audio (e.g. MPEG) decoder 616, and the microcontroller 150 and/or data storage processor 630 for further data manipulation. In one embodiment of the present invention, the transport module, video decoder and audio decoder are all implemented on integrated circuits. This design promotes both space and power efficiency, and increases the security of the functions performed within the transport module 608. The transport module 608 also provides a passage for communications between the microprocessor 610 and the video and audio decoders 614, 616. As set forth more fully hereinafter, the transport module may also operate in conjunction with a conditional access module (CAM) 612 to determine whether the subscriber receiving station 110 is permitted to access certain program material. Data from the transport module can also be supplied to external communication module 626.

The CAM 612 functions in association with other elements to decode an encrypted signal from the transport module 608. The CAM 612 may also be used for tracking and billing these services. In one embodiment of the present invention, the CAM 612 is a smart card, having contacts cooperatively interacting with contacts in the STB 112 to pass information. In order to implement the processing performed in the CAM 612, the STB 112, and specifically the transport module 608 provides a clock signal to the CAM 612.

Video data is processed by the MPEG video decoder 614. Using the video random access memory (RAM) 636, the MPEG video decoder 614 decodes the compressed video data and sends it to an encoder or video processor 615, which converts the digital video information received from the video MPEG module 614 into an output signal usable by a display or other output device. By way of example, processor 615 may comprise a National TV Standards Committee (NTSC) or Advanced Television Systems Committee (ATSC) encoder. In one embodiment of the invention both S-Video, baseband video and RF modulated video (NTSC or ATSC) signals are provided. Other outputs may also be utilized, and are advantageous if ATSC high definition programming is processed.

Audio data is likewise decoded by the MPEG audio decoder 616. The decoded audio data may then be sent to a digital to analog (D/A) converter 618. In one embodiment of the present invention, the D/A converter 618 is a dual D/A converter, one for the right and left channels. If desired, additional channels can be added for use in surround sound processing or secondary audio programs (SAPs). In one embodiment of the invention, the dual D/A converter 618 itself separates the left and right channel information, as well as any additional channel information. Other audio formats such as DOLBY DIGITAL AC-3 may similarly be supported.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

The microprocessor 610 receives and processes command signals from the remote control 624, an STB 112 keyboard interface, modem 640, and transport 608. The microcontroller receives commands for performing its operations from a processor programming memory, which permanently stores such instructions for performing such commands. The memory used to store data for microprocessor 610 and/or transport 608 operations may comprise a read only memory (ROM) 638, an electrically erasable programmable read only memory (EEPROM) 622, a flash memory 652 and/or a random access memory 650, and/or similar memory devices. The microprocessor 610 also controls the other digital devices of the STB 112 via address and data lines (denoted "A" and "D" respectively, in FIG. 6).

The modem 640 connects to the customer's phone line via the PSTN port 120. It calls, e.g. the program provider, and transmits the customer's purchase information for billing purposes, and/or other information. The modem 640 is controlled by the microprocessor 610. The modem 640 can output data to other I/O port types including standard parallel and serial computer I/O ports. Data can also be obtained from a cable or digital subscriber line (DSL) modem, or any other suitable source.

The STB 112 may also comprise a local storage unit such as the storage device 632 for storing video and/or audio and/or other data obtained from the transport module 608. Video storage device 632 can be a hard disk drive, a read/writeable compact disc of DVD, a solid state RAM, or any other storage medium. In one embodiment of the present invention, the video storage device 632 is a hard disk drive with specialized parallel read/write capability so that data may be read from the video storage device 632 and written to the device 632 at the same time. To accomplish this feat, additional buffer memory accessible by the video storage 632 or its controller may be used. Optionally, a video storage processor 630 can be used to manage the storage and retrieval of the video, audio, and/or other data from the storage device 632. The video storage processor 630 may also comprise memory for buffering data passing into and out of the video storage device 632. Alternatively or in combination with the foregoing, a plurality of video storage devices 632 can be used. Also alternatively or in combination with the foregoing, the microprocessor 610 can also perform the operations required to store and or retrieve video and other data in the video storage device 632.

The video processing module 615 output can be directly supplied as a video output to a viewing device such as a video or computer monitor. In addition the video and/or audio outputs can be supplied to an RF modulator 634 to produce an RF output and/or 8 vestigal side band (VSB) suitable as an input signal to a conventional television tuner. This allows the STB 112 to operate with televisions without a video input.

As data is received and stored in the memory, the microprocessor 610 acts as a control device and performs various operations on the data in preparation for processing the received data. These operations include packet assembly, object assembly and object processing.

The first operation performed on data objects stored in the memory 650 is packet assembly. During the packet assembly operation, microprocessor 610 examines the stored data and determines the locations of the packet boundaries. Packet identifiers (PIDs) associated with particular media programs in a transport stream are obtained, and packets having the same PID are assembled together to form video information.

The next step performed by microprocessor 610 is object assembly. During the object assembly step, microprocessor 610 combines packets to create object frames, and then combines the object frames to create objects. Microprocessor 610 examines the checksum transmitted within each object frame, and verifies whether the frame data was accurately received. If the object frame was not accurately received, it is discarded from memory 650. Also during the object assembly step, the microprocessor 610 discards assembled objects that are of an object type that the microprocessor 610 does not recognize. The STB 112 maintains a list of known object types in memory 650. The microprocessor 610 examines the object header of each received object to determine the object type, and the microprocessor 610 compares the object type of each received object to the list of known object types stored in memory 650. If the object type of an object is not found in the list of known object types, the object is discarded from memory 650. Similarly, the STB 112 maintains a list of known descriptor types in memory 650, and discards any received descriptors that are of a type not in the list of known descriptor types.

The last step performed by microprocessor 610 on received object data is object processing. During object processing, the objects stored in the memory 650 are combined to create a digital image. Instructions within the objects direct microprocessor 610 to incorporate other objects or create accessible user-links. Some or all of the digital images can be later converted to an analog signal that is sent by the STB 112 to a television or other display device for display to a user.

The functionality implemented in the STB 112 depicted in FIG. 6 can be implemented by one or more hardware modules, one or more software modules defining instructions performed by a processor, or a combination of both.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. For example, although the foregoing disclosure makes use of the distinction between episodes of a media program, the foregoing has equal applicability to a movie using a feed-in program before broadcast of the movie.

In view of the above, embodiments of the invention enable a live pre-show that can be simulcast without editing and syndicated across vast numbers of digital platforms for the purpose of aggregating an audience to the same experience and then throwing that audience to the subsequent on-air broadcast.

Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of generating viewership of a broadcast of a media program by an affiliate to a plurality of receiver stations, each receiver station associated with at least one user, the broadcast commencing on a first communication channel at a broadcast commencement time, the media program provided by a media program provider, the method comprising:
   (a) commencing transmission of a live prefacing media program on a second communication channel before the broadcast commencement time, wherein the live prefacing media program comprises user-identifiable content related to the broadcast of the media program;
   (b) accepting identifiers of the user-identifiable content;
   (c) substantially automatically altering the live prefacing media program during transmission of the live prefacing media program according to an aggregate of the accepted identifiers of the user-identifiable content at least in part according to an objective popularity measure;
   (d) further transmitting the altered live prefacing media program from the media program provider;
   (e) repeating steps (b)-(d) until the broadcast commencement time; and
   (f) terminating the transmission of the live prefacing media program on the second communication channel immediately before the broadcast commencement time of the media program on the first communication channel.

2. The method of claim 1, wherein the media program is an episode of a series.

3. The method of claim 2, wherein the media program is provided by a media program provider to the affiliate serving a market for the broadcast of the episode by the affiliate and the broadcast is subject to an affiliate license exclusive to the market.

4. The method of claim 3, wherein:
the episode of the affiliate is transmitted on the first communication channel; and
the live prefacing media program and the altered live prefacing media program are transmitted on the second communication channel.

5. The method of claim 4, wherein:
the transmission of the live prefacing media program is not forbidden under the affiliate license in the market.

6. The method of claim 5, wherein the identifiers of the user identifiable content are received via at least one of a third plurality of communications channels independent from the first communication channel.

7. The method of claim 6, wherein:
the second communication channel is one of a plurality of second communication channels independent from the first communication channel; and
the live prefacing media program is formatted for transmission on any of a plurality of second communication channels without modification.

8. The method of claim 1, wherein the live prefacing media program is configured to tune a device at the receiver station to receive the media program transmitted by the affiliate at the broadcast commencement time.

9. The method of claim 1, further comprising:
accepting user messages from the receiver station;
selecting accepted user messages for transmission with the live prefacing media program; and
altering the live prefacing media program to include the selected user messages.

10. The method of claim 9, wherein:
the user identifiable content comprises a listing of plurality of user-identifiable persons depicted in the media program and a listing of a plurality of user-identifiable questions;
the live prefacing media program further comprises concurrently presented portions, comprising:
a first portion presenting the plurality of user identifiable persons depicted in the media program;
a second portion presenting the plurality of user-identifiable questions to be asked of the persons depicted in the media program; and
a third portion having a media player for playing live media related to the media program, the live media comprising at least one of the user-identifiable persons providing answers to at least one of the user-identifiable questions, as determined by the accepted identifiers.

11. The method of claim 10, wherein the user-identifiable questions are determined from the accepted user messages.

12. The method of claim 1, wherein
the transmitted live prefacing media program further comprises a plurality of concurrently presented user-identifiable portions, comprising:
a first live prefacing media program portion having a media player for playing the at least a portion of one of more of previously broadcast episodes of the media program;
a second live prefacing media program portion presenting a plurality portions of the one or more of the previously broadcast episodes of the media program, each of the plurality of portions being user identifiable by a unique identifier transmittable to the media program provider; and
a third live prefacing media program portion presenting at least one of the plurality of user identifiable portions of the one or more previously broadcast episodes of the media program, the at least one of the user identifiable portions selected according unique identifiers received by the media program provider.

13. The method of claim 12, further comprising:
automatically scrolling through all of the user identifiable portions of the previously broadcast episodes in the second live prefacing media program portion.

14. The method of claim 12, wherein:
the received unique identifiers reflect user votes for the user identifiable portions of the one or more previously broadcast episodes of the media program; and
the third live prefacing program portion presents the user identifiable portion of the portion of the one or more previously broadcast episodes of the media program receiving the greatest percentage of user votes.

15. The method of claim 14, wherein the media player in the first live prefacing media program portion repeatedly plays the portion of the previously broadcast episode of the media program currently receiving the most user votes and no other previously broadcast episodes of the media program.

16. The method of claim 15, wherein the media player in the first live prefacing media program portion further plays advertisements.

17. The method of claim 16, further comprising:
temporarily altering the live prefacing media program to delete the second live prefacing media program portion and expanding the third live prefacing media program portion to former area of the second live prefacing media program portion to present an ordered plurality of user identifiable portions of the one or more broadcast episodes receiving the greatest percentage of votes.

18. An apparatus for generating viewership of a broadcast of a media program by an affiliate to a plurality of receiver stations, each receiver station associated with at least one user, the broadcast commencing on a first communication channel at a broadcast commencement time, the media program provided by a media program provider, the apparatus comprising:
a server for commencing transmission of a live prefacing media program on a second communication channel before the broadcast commencement time, wherein the live prefacing media program comprises user-identifiable content related to the broadcast of the media program;
a viewer feedback module for accepting identifiers of the user-identifiable content;
a generation module for substantially automatically altering the live prefacing media program during transmission of the live prefacing media program according to an aggregate of the accepted identifiers of the user-identifiable content at least in part according to an objective popularity measure; and
wherein the server further transmits the altered live prefacing media program from the media program provider and terminates the transmission of the live prefacing media program on the second communication channel substantially immediately before the broadcast commencement time of the media program on a first communication channel.

19. The apparatus of claim 18, wherein the media program is an episode of a series.

20. The apparatus of claim 19, wherein the media program is provided by a media program provider to the affiliate serving a market for the broadcast of the episode by the affiliate and the broadcast is subject to an affiliate license exclusive to the market.

21. The apparatus of claim 20, wherein:
the episode of the affiliate is transmitted on the first communication channel; and
the live prefacing media program and the altered live prefacing media program are transmitted on the second communication channel.

22. The apparatus of claim 21, wherein:
the transmission of the live prefacing media program is not forbidden under the affiliate license in the market.

23. The apparatus of claim 22, wherein the identifiers of the user identifiable content are received via at least one of a third plurality of communications channels independent from the first communication channel.

24. The apparatus of claim 23, wherein:
the second communication channel is one of a plurality of second communication channels independent from the first communication channel; and
the live prefacing media program is formatted for transmission on any of a plurality of second communication channels without modification.

25. The apparatus of claim 24, wherein the live prefacing media program is configured to tune a device at the receiver station to receive the media program transmitted by the affiliate at the broadcast commencement time.

26. The apparatus of claim 18, wherein:
the viewer feedback module further accepts user messages from the receiver station; and
the generation module selects accepted user messages for transmission with the live prefacing media program, and alters the live prefacing media program to include the selected user messages.

27. The apparatus of claim 26, wherein:
the user identifiable content comprises a listing of plurality of user-identifiable persons depicted in the media program and a listing of a plurality of user-identifiable questions;
the live prefacing media program further comprises concurrently presented portions, comprising:
a first portion presenting the plurality of user identifiable persons depicted in the media program;
a second portion presenting the plurality of user-identifiable questions to be asked of the user-identifiable persons depicted in the media program; and
a third portion having a media player for playing live media related to the media program, the live media comprising at least one of the user-identifiable persons providing answers to at least one of the user-identifiable questions, as determined by the accepted identifiers.

28. The apparatus of claim 27, wherein the user-identifiable questions are determined from the accepted user messages.

29. The apparatus of claim 18, wherein:
the transmitted live prefacing media program further comprises a plurality of concurrently presented user-identifiable portions, comprising:
a first live prefacing media program portion having a media player for playing the at least a portion of one or more previously broadcast episodes of the media program;
a second live prefacing media program portion presenting a plurality portions of the one or more of the previously broadcast episodes of the media program, each of the plurality of portions being user identifiable by a unique identifier transmittable to the media program provider; and
a third live prefacing media program portion presenting at least one of the plurality of user identifiable portions of the one or more previously broadcast episodes of the media program, the at least one of the user identifiable portions selected according unique identifiers received by the media program provider.

30. The apparatus of claim 29, wherein the live prefacing media program automatically scrolls through all of the user identifiable portions of the previously broadcast episodes of the media program in the second live prefacing media program portion.

31. The apparatus of claim 29, wherein:
the received unique identifiers reflect user votes for the user identifiable portions of the one or more previously broadcast episodes of the media program; and
the third live prefacing program portion presents the user identifiable portion of the portion of the one or more previously broadcast episodes of the media program receiving the greatest percentage of user votes.

32. The apparatus of claim 31, wherein the media player in the first live prefacing media program portion repeatedly plays the portion of the previously broadcast episode of the media program currently receiving the most user votes and no other previously broadcast episodes of the media program.

33. The apparatus of claim 32, wherein the media player in the first live prefacing media program portion further plays advertisements.

34. The apparatus of claim 33, wherein the generation module further temporarily alters the live prefacing media program to delete the second live prefacing media program portion and expanding the third live prefacing media program portion to former area of the second live prefacing media program portion to present an ordered plurality of user identifiable portions of the one or more broadcast episodes receiving the greatest percentage of votes.

35. A system for generating viewership of a broadcast of a media program by an affiliate, the broadcast commencing on a first communication channel at a broadcast commencement time, the media program provided by a media program provider, the comprising:
a plurality of receiver stations, each associated with at least one user, for receiving the broadcast of the media program;
a server for commencing transmission of a live prefacing media program before the broadcast commencement time, wherein the live prefacing media program comprises user-identifiable content related to the broadcast of the media program;
a viewer feedback module for accepting identifiers of the user-identifiable content;
a generation module for substantially automatically altering the live prefacing media program during transmission of the live prefacing media program according to an aggregate of the accepted identifiers of the user-identifiable content at least in part according to an objective popularity measure; and
wherein the server further transmits the altered live prefacing media program from the media program provider and terminates the transmission of the live prefacing media program on the second communication channel substantially immediately before the broadcast commencement time of the media program on the first communication channel.

* * * * *